(12) United States Patent
Herman et al.

(10) Patent No.: US 11,157,114 B1
(45) Date of Patent: Oct. 26, 2021

(54) VEHICLE SURFACE DEFORMATION IDENTIFICATION

(71) Applicant: Ford Global Technologies, LLC, Dearborn, MI (US)

(72) Inventors: David Michael Herman, Oak Park, MI (US); Nicholas Alexander Scheufler, Flat Rock, MI (US); Nunzio DeCia, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/023,882

(22) Filed: Sep. 17, 2020

(51) Int. Cl.
*G06F 3/042* (2006.01)
*G06F 3/0484* (2013.01)
*G06F 3/01* (2006.01)

(52) U.S. Cl.
CPC ............ *G06F 3/0425* (2013.01); *G06F 3/016* (2013.01); *G06F 3/0484* (2013.01)

(58) Field of Classification Search
CPC .... G06F 1/1645; G06F 1/1673; G06F 3/0425; G06F 3/0426; G06F 3/016; G06F 3/0484
See application file for complete search history.

(56) References Cited

U.S. PATENT DOCUMENTS

| | | | |
|---|---|---|---|
| 8,446,367 B2 | 5/2013 | Benko et al. | |
| 9,768,748 B2 | 9/2017 | Seefeldt | |
| 2009/0295730 A1* | 12/2009 | Shin | G06F 3/0426 345/168 |
| 2013/0179811 A1 | 7/2013 | Nagara et al. | |
| 2015/0070319 A1 | 3/2015 | Pryor | |
| 2020/0356159 A1* | 11/2020 | Mutlu | G06F 3/011 |

FOREIGN PATENT DOCUMENTS

| | | |
|---|---|---|
| EP | 2213501 A3 | 8/2010 |
| EP | 2581248 B1 | 11/2016 |
| JP | 2004272821 A | 9/2004 |

OTHER PUBLICATIONS

"Characteristic properties of Silicone Rubber Compounds", ShinEtsu Silicone, Aug. 2016, www.shinetsusilicone-global.com.
If It's Controllable in the Future, It's By Marquardt, https://us.marquardt.com/, Apr. 22, 2020, Marquardt Gruppe.

* cited by examiner

*Primary Examiner* — Lisa S Landis
(74) *Attorney, Agent, or Firm* — Frank Lollo; Bejin Bieneman PLC (57) ABSTRACT

A computer includes a processor and a memory, the memory storing instructions executable by the processor to project an icon onto a surface having a pattern, capture an image of the icon and the pattern, identify a change between the pattern in the image and a default pattern, identify a user input based on the change from the default pattern, and actuate a component based on the user input.

18 Claims, 10 Drawing Sheets

VEHICLE SURFACE DEFORMATION IDENTIFICATION

BACKGROUND

A vehicle can include interfaces for users to control components in the vehicle. For example, the vehicle can include a touchscreen display that presents images (icons, virtual buttons, etc.) that the user can select, e.g., by touching with a finger, to control features in the vehicle. For example, the images can include settings for climate control in the vehicle. In another example, the images can include options for entertainment in the vehicle. Upon providing input to the touchscreen display, a computer actuates one or more components to provide the output requested by the user.

DETAILED DESCRIPTION

Modern vehicles can include customizable user interfaces. These user interfaces can be upgraded and changed over time. Some users may prefer simplified vehicle interiors with fewer visible and/or prominent physical buttons, and/or fewer buttons with static functionality (i.e., dedicated to one function) or static physical presence (i.e., always physically present). This preference has particular application in user interfaces or dashboards that connect a user to a Human-Machine Interface (HMI), i.e., a machine, system, or device to which a user provides input to operate one or more vehicle components.

The user can provide different types of inputs to the HMI to operate the components. For example, the user can provide a compressive input as if pressing a physical button. In another example, the user can provide a rotational input as if rotating a physical dial. A surface that can detect these different types of inputs allows a vehicle computer to operate components according to the user's intent. A pattern drafted onto the surface in invisible ink can deform when receiving the user input. The deformation changes based on the specific type of input provided by the user. A camera can detect the deformation to the pattern, and the computer can identify the user input based on the detected deformation. Based on the user input, the computer can actuate the components. Providing an HMI that can detect the different types of user inputs allows the user to provide inputs to components with a customizable interface and allows the computer to better identify specific user intent than a conventional HMI that cannot differentiate between different types of user inputs.

Figure 1:
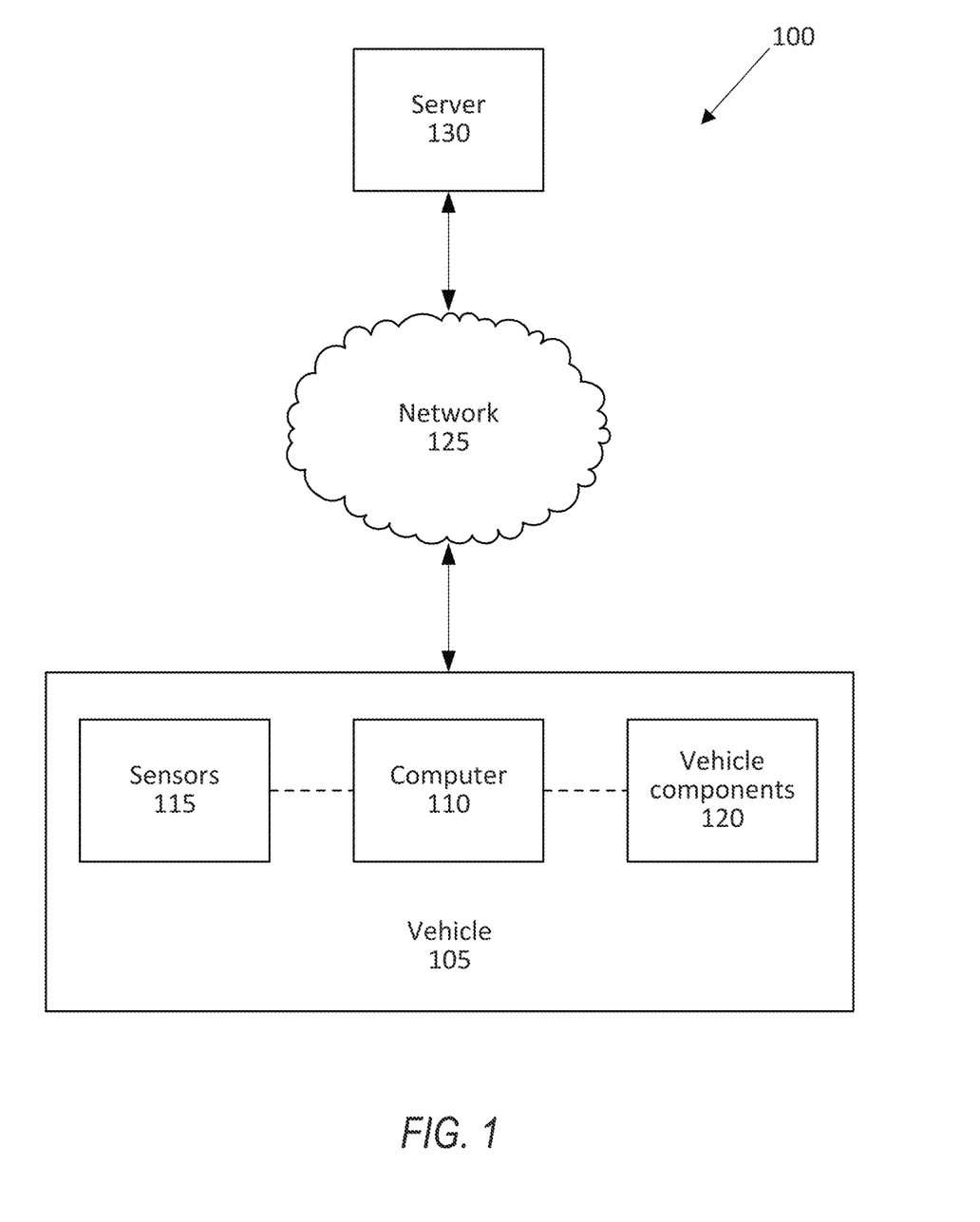
FIG. 1 is a diagram of an example system for operating components of a vehicle.

FIG. 1 illustrates an example system 100 for operating components of a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

A vehicle 105 can operate in one of a fully autonomous mode, a semiautonomous mode, or a non-autonomous mode. A fully autonomous mode is defined as one in which each of vehicle 105 propulsion (typically via a powertrain including an electric motor and/or internal combustion engine), braking, and steering are controlled by the computer 110. A semi-autonomous mode is one in which at least one of vehicle 105 propulsion (typically via a powertrain including an electric motor and/or internal combustion engine), braking, and steering are controlled at least partly by the computer 110 as opposed to a human operator. In a non-autonomous mode, i.e., a manual mode, the vehicle 105 propulsion, braking, and steering are controlled by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2A:
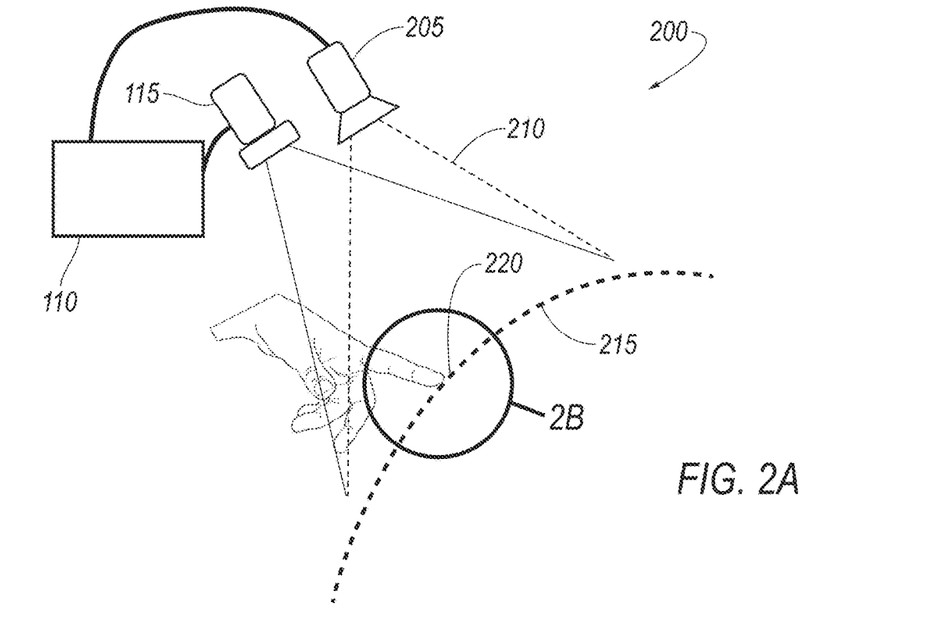
FIG. 2A is a view of a user providing input to a surface to operate the components.
Figure 2B:
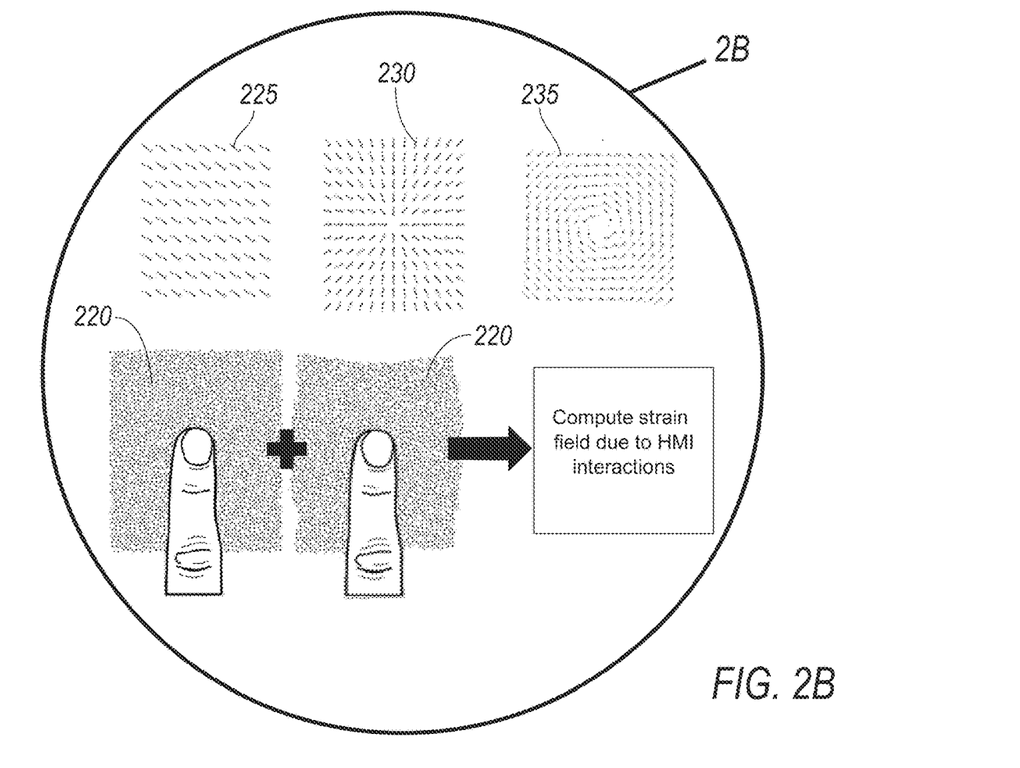
FIG. 2B is a view of forces applied to the surface from the user input.

FIGS. 2A-2B show a view of a projector assembly 200. This projector assembly 200 includes a projector 205. The projector 205 projects an icon 210 on a selected surface 215. An "icon" 210 is an image on the surface 215 to which a user can provide input. For example, the icon 210 can be a visible image projected onto the surface 215 by the projector 205. The projected icon 210 can be a static image, i.e., an image that does not change in time, or a dynamic image, i.e., an image that changes over time. Changes to the dynamic image can include, e.g., the image changing color, the image flashing, the image changing text, etc. In another example, the icon 210 can be a visible image drawn or affixed to the surface 215, e.g., a decal or a painted image. The icon 210 can be a polygon (e.g., a square button, a circular dial, a triangular arrow, etc.), a set of text characters, etc. The projector 205 can project a visible icon 210 on the surface 215, i.e., light in the visible light range. The surface 215 can be a surface of, e.g., an instrument panel, a door panel, etc. That is, the surface 215 is a portion of an interior of the vehicle 105 accessible by a user's hand. Alternatively or additionally, the projector 205 can project e.g., near infrared, ultraviolet, and light radiation of other wavelengths that may be reactive with the surface 215 or a pattern 220 within the surface 215. That is, human eyes can see light radiation having wavelengths between about 400 nanometers (nm) (seen as violet) to about 700 nm (seen as red), i.e., a "visible light range." Light radiation below 400 nm or above 700 nm is not visible by human eyes and is thus not in the visible light range.

A pattern 220 can be embedded on the surface 215. The "pattern" 220 is a predetermined drawing or image on the surface 215 that the user disturbs when providing input to the icon 210. For example, the pattern 220 can be, e.g., a dot lattice, a tiling of squares, a tiling of hexagons, a tiling of triangles, a set of text characters, etc. The pattern 220 on the surface 215 is a "default" pattern 220, i.e., a pattern 220 that is not deformed by user input. That is, when the user provides input to the surface 215, the input induces a change from the default pattern 220.

The pattern 220 can be written with invisible ink, i.e., ink that does not reflect light in the visible light range. Invisible inks as are known can fluoresce at wavelengths below 400 nm in the UV range and above 700 nm in the IR range. To "fluoresce" is to emit electromagnetic waves at a first wavelength upon absorbing electromagnetic waves at a second wavelength. For example, the invisible ink can emit electromagnetic waves in the visible light range upon absorbing electromagnetic waves in the UV range. Alternatively or additionally, the projector 205 can project the pattern 220 in UV, visible, or IR light onto the surface 215. For example, the projector 205 can be a vertical cavity surface emitting laser (VCSEL) light emitting diode (LED) that projects consistently spaced apart dots as the pattern 220 on the surface 215. In such an example, the projector 205 may present visible light icons 210 on the surface 215 while also projecting a pattern 220 in a near infrared ("NIR") range that would not be visible to users. The NIR pattern 220 can be, e.g., a dot lattice. Such a pattern 220 can be detected by a camera 115 programmed to detect light in the NIR range to compute a three-dimensional depth of the surface 215, as described below. The computer 110 can combine the depth of the surface 215 and detection of deformation of the pattern 220 to more accurately detect user input than using a two-dimensional image.

In addition to invisible ink coatings, other coatings and processes for making an "invisible" pattern 220 can be used. For example, piezochromic inks and coatings can be used for the invisible ink pattern 220. Piezochromic ink and coatings are materials that change color under pressure (shock, impact, strain). The computer 110 can correlate changes in color to an input selection on the HMI. In another example, the surface 215 can be porous to light. The porous surface 215 can have backlighting in the IR or UV spectrum that appears to the camera 115 as a pattern 220. Alternatively or additionally, the pattern 220 can be, e.g., a luminescent mechanochromism (LM) coating which emits intensive fluorescence when stretched, a color alteration mechanochromism (CAM) coating which changes between two or more colors as additional force is applied (e.g., from green, to yellow, then to orange), and/or an encryption mechanochromism (EM) coating which is a bilayer system containing a rigid thin film and a substrate that can reversibly reveal and conceal the pattern 220 upon application of a force. The soft, flexible, elastic material of the surface 215 allows the camera 115 to track the pattern 220 (e.g. with visible, infrared (IR) or ultraviolet (UV) detection cameras or camera filters) and the computer 110 can detect a deformation or change in the material state of the surface 215 from input to an icon 210. Thus, when a user provides input to the surface 215, the input causes a change from the default pattern 220, e.g., a change in color, a change in shape, a change in luminance, a revealing of a second pattern 220, etc.

The projector assembly 200 can include one or more camera(s) 115. The cameras 115 can detect an input from a user to one of the icons 210. The camera 115 can be designed to capture one or more wavelengths of light, e.g. infrared, near-infrared, ultra-violet, and/or visible light radiation. A color filter array can filter individual wavelengths for each pixel on the camera 115, as described below. The cameras 115 can include one or more cameras 115 that can detect IR and/or UV light to detect the pattern 220 on the surface 215. Alternatively or additionally, the camera 115 can detect changes in this backlit pattern 220 on the surface 215 when a user applies a force to the surface 215.

The projector assembly 200 can include a single camera 115 or multiple cameras 115. For example, some vehicles 105 include an in-vehicle camera 115 for monitoring the alertness and state of a user. In other applications, some vehicles 105 may include more than one in-vehicle camera 115 for hand gesture recognition. The computer 110 can use data from the in-vehicle cameras 115 with the to monitor the user's interactions with projected icons 210 on the surface 215 and the pattern 220. For example, the projector assembly can include two separate cameras 115, one camera 115 being a visible light camera 115 and the other camera 115 sensor being a camera 115 with a near infrared (NIR) filter that blocks light outside of a specified range of wavelengths in the IR range near the visible light range, e.g., 750-1000 mm. The visible light camera 115 can be suitable to detect the position of a user's hand or finger and the NIR filter of the other camera 115 can be suitable to detect deformations in the detection pattern 220. That is, the computer 110 can identify a finger of the user providing the user input based on collected thermal data from the finger. The finger can block transmission of electromagnetic waves in the NIR range, i.e., "NIR waves," from the surface 215. The computer 110 can identify, from the data collected in the NIR range of the surface 215 and the finger, a portion of the surface 215 that emits fewer NIR waves than other portions of the surface. The computer 110 can identify the portion that emits fewer NIR waves as a portion at which a finger contacts the surface 215, i.e., as user input to an icon at the portion of the surface 215.

The pattern 220 can be consistently spaced along the surface 215, i.e., spacing between any two portions of the pattern 220 on the surface 215 can be substantially similar. That is, if the surface 215 has a curvature, the memory of the computer 110 can include a digital schematic of the curvature of the surface 215 and can detect deformation of the curved surface 215. In an application where the surface 215 is curved, the VCSEL projector 205 can project the detection pattern 220 for the curved surface 215. When the user provides physical input to, i.e., touches, the surface 215 at a projected icon 210, deforming the surface 215, the distances between the respective dots in the detection pattern 220 change. The computer 110 can apply an image processing technique to the change in the detection pattern 220 based on the surface geometry of the surface 215 determine the user input to the icon 210.

The VCSEL projector 205 and camera 115 can also measure a depth to the surface 215 in addition to the deformation of the surface 215. A "depth" in this context is a measure of a distance between the camera 115 and the surface 215. The computer 110 can use the projected dot detection pattern 220 on a three-dimensional surface 215 to obtain a three-dimensional position of the user's hand relative to projected icons 210 on the surface 215. The computer 110 can use both the invisible ink dot detection pattern 220 on a two-dimensional surface 215 and the projected dot detection pattern 220 on a three-dimensional surface 215 to obtain a three-dimensional position of the user's hand and corresponding force(s) applied to one or more icons 210 on the surface 215. Detecting the user's hand allows the computer 110 to recognize a hand gesture performed by the user. In this context, a "hand gesture" is a specified movement of a hand that correlates to a specified user input. For example, the hand gesture can be a rotation of a finger that correlates to a change in a volume setting for an entertainment controller. In another example, the hand gesture can be a movement of the finger toward the icon 210, prior to applying force to the icon 210, that correlates to providing input to the icon 210. In another example, by combining the three-dimensional hand position and the deformation of the surface 215, individual force(s) applied by individual fingers can be separately detected. The computer 110 can then detect user input from each finger.

The projector assembly 200 can include a depth sensing camera 115 to decrease false positive detections of input to the icons 210. A "false positive" detection of input to the icons 210 is a determination by the computer 110 that the user has provided input to the icons 210 when the user has not provided input to the icons 210. For example, the pattern 220 can appear to change, indicating a deformation of the surface 215, but the depth sensing camera 115 may not detect the presence of the user's hand within a specified distance threshold to the icons 210. The computer 110 can ignore these apparent deformations of the surface 215 when the user's hand is not within the distance threshold, suppressing actuation of one or more components 120.

Data processing techniques for detecting false positive detections, as are known, can be applied to improve detection and measurements using conventional sensor fusion techniques and algorithms, e.g. Kalman filters, particle filters, KL divergence, etc. The sensor fusion process can include data on both the three-dimensional position of the user's hands and fingers and the icons 210, e.g., from the depth of the user's hands and the depth of the icons 210 determined by the depth sensing camera 115. For example, the computer 110 can input the three-dimensional position data of the user's hand and the depth data of the icons 210 to a Kalman filter that updates a covariance matrix, i.e., a statistical uncertainty between the data about the user's hand and the data about the icons 210, describing the statistical covariance between the two sets of data. That is, the covariance matrix describes an amount of noise in the data about the user's hand and the data about the icons 210. When the covariance is below a threshold, the computer 110 can determine that the user has provided input to the icons 210. When the covariance exceeds the threshold, the computer 110 can determine that the user has not provided input to the icons 210. In another example, two Kalman filters may be used separately. A first filter can output the distance of the finger from the surface 215. The output of the first Kalman filter may be used to generate a bilinear output function to dynamically modify a noise covariance matrix of a second Kalman filter to predict the surface deformation. The thresholds described above can be determined based on empirical testing of a test user providing input to a test surface 215 while a test depth sensing camera 115 collects data about the user's hand and the test surface 215. The first and second Kalman filters can be incorporated into a machine learning program trained with the empirical test data used to determine the thresholds described above to learn the interactions between the distance of the user's finger from the surface 215 and the deformation of the surface 215. Alternatively or additionally, the computer 110 can use other data processing techniques described above to detect false positive detections.

Even if the depth sensing accuracy is limited, the depth sensing camera 115 can provide further data during the sensor fusion process. By tracking the location of the user appendages over time, the computer 110 can reduce the rate of false positive detections. That is, the computer 110 can compare the three-dimensional position of the user's fingers to the three-dimension position of the icons 210, e.g., the computer 110 can determine a Euclidean distance between the position of the user's fingers and the position of the icons 210. If, in this example, the Euclidean distance between the user's fingers and the position of the icons 210 is not within a predetermined threshold, the computer 110 can determine that the user has not provided input to the icons 210. The threshold can be an average width of a finger, e.g., 10 mm.

The surface 215 can be substantially flat or the surface 215 can have one or more three-dimensional portions. For example, three-dimensional "pull tabs" can protrude from the surface 215. The "pull tabs" or rubber notches can be integrally molded into the surface 215. The three-dimensional portions can include an ink pattern 220 or a projected "invisible" or visible pattern 220. A user can interact with an icon 210 projected on one of the "pull tabs" or notches on the surface 215, and the camera 115 can detect disturbances in the pattern 220 on the pull tabs. Alternatively or additionally, the surface 215 can include near-infrared transparent plastic with a collection of flexible peg supports underneath. For example, the surface 215 can include, e.g., near-infrared transparent plastic, vinyl, fabric or a combination thereof. The surface 215 can be supported by flexible peg supports underneath with backlighting in the visible, infrared, or ultraviolet spectrum. The backlighting can present a pattern 220 on the surface 215. The pattern 220 appearing on the surface 215 can include one or more icons 210.

The computer 110 can detect an applied force, shear, or rotation by a user to the surface 215, as described below. The projector assembly 200 communicates with the computer 110 over a CAN bus. The projector 205 and the camera 115 are in electronic communication with the computer 110 to execute instructions for projecting icons 210 on to a surface 215. The computer 110 can process images collected by the camera 115, including the icons 210, and can capture disturbances of the surface 215.

When a user interacts with the icon 210 on the surface 215, the camera 115 can detect disturbances in the pattern 220. The computer 110 can use one or more conventional algorithms to correlate the disturbances into detected position, shear, tension, compressive, and rotation forces. For example, the camera 115 can detect shear forces by a corresponding change in the pattern 220 on the surface 215. The change in the pattern 220 can be represented by a vector field 225, 230, 235. A "vector field" is a visual representation of the change of the pattern 220 at specified points on the surface 215 upon receiving input from the user. Each strain on the surface 215 translates the pattern 220 from a default pattern 220, generating a deformed pattern 220. A shear force, a compressive force, or a rotational force on the surface can provide different deformed patterns 220, represented by the vector fields 225, 230, 235. That is, each arrow in the vector field 225, 230, 235 shown in FIG. 2 represents a change of the pattern 220 from the default pattern 220 in a specific direction. For example, a shear vector field 225 represents translation of the deformed pattern 220 from the default pattern 220 along a vector. In another example, a compressive vector field 230 represents translation of the deformed pattern 220 from the default pattern 220 toward a point. In another example, a rotational vector field 235 represents translation of the deformed pattern from the default pattern 220 around a circle.

In another example, the camera 115 can identify shear, compressive, and/or rotational deformations, e.g. strain, on the surface 215. The computer 110 can predict shear forces, compressive forces, and/or rotational forces from the deformed pattern 220. That is, based on the deformed pattern 220 generated by the user input to the default pattern 220 and/or the icon 210, the computer 110 can identify at least one of a shear force, a compressive force, and/or a rotational force. As described above, the computer 110 can identify the direction of the strains from the deformed pattern 220 and, using a conventional algorithm that identifies forces from strains such as a finite element model (FEM) that uses conventional elastic force-to-strain equations, the computer 110 can identify the force applied to the surface 215 that generated the deformed pattern 220.

The computer 110 can classify the user input to a classification based on the deformation of the surface 215. The classification can be one of a compressive input, a shear input, or a rotation input. That is, based on the specific force applied to the surface 215, as determined with the FEM model described above, the computer 110 can classify the input to the classification. For example, if the computer 110 identifies a shear force from a change in the pattern 220 as described above, the computer 110 can classify the input as a shear input. In another example, if the computer 110 identifies a compressive force, the computer 110 can classify the input as a compressive input. In another example, if the computer 110 identifies a circular force, the computer 110 can classify the input as a rotational input. The computer 110 can actuate one or more components 120 based on the classification of the input. For example, the computer 110 can actuate an entertainment controller to adjust a volume of a speaker upon identifying the input as a rotational input. The computer 110 can adjust the volume based on a magnitude and direction of the rotational input to the surface 215. In another example, the computer 110 can actuate a climate controller to adjust a specified cabin temperature of the vehicle 105 upon identifying the input as a compressive input.

Figure 3A:
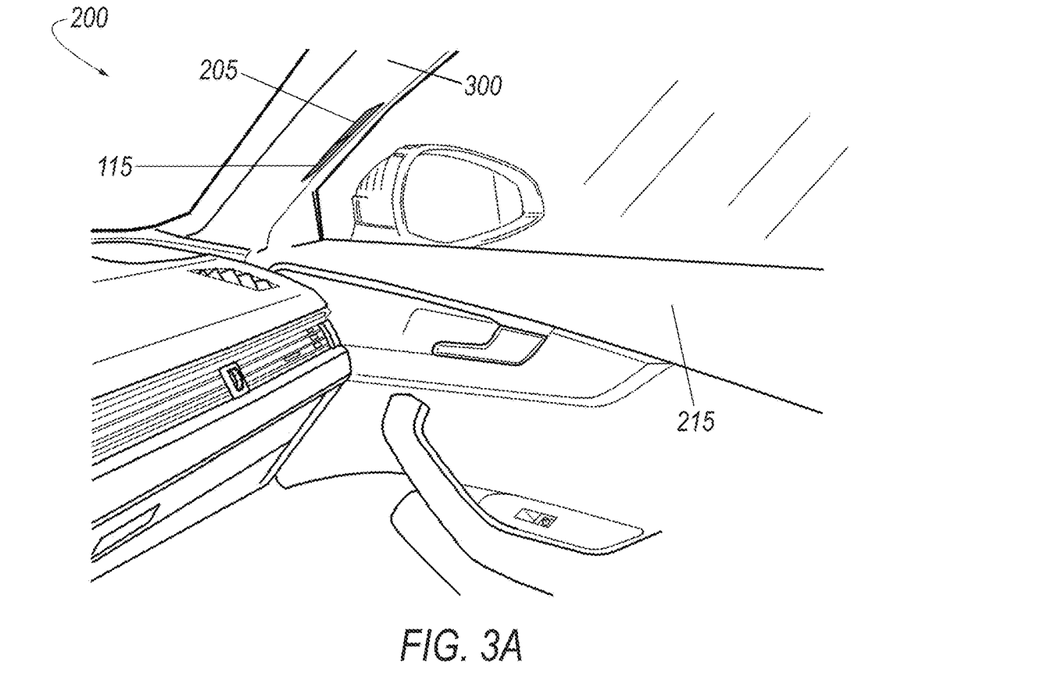
FIGS. 3A-3E are example views of a projector projecting icons onto the surface for user input.

FIGS. 3A-3E are examples of the projector assembly 200 projecting icons 210 in a vehicle 105. FIG. 3A illustrates an interior of the vehicle 105. The projector 205 and the camera 115 can be mounted into a pillar 300, an exterior of the vehicle 105, or another surface 215 of the vehicle 105. The projector 205 can project an icon 210 and/or a detectable pattern 220 onto a surface 215. In the example of FIG. 3A, the projector 205 does not project any icons 210.

Figure 3B:
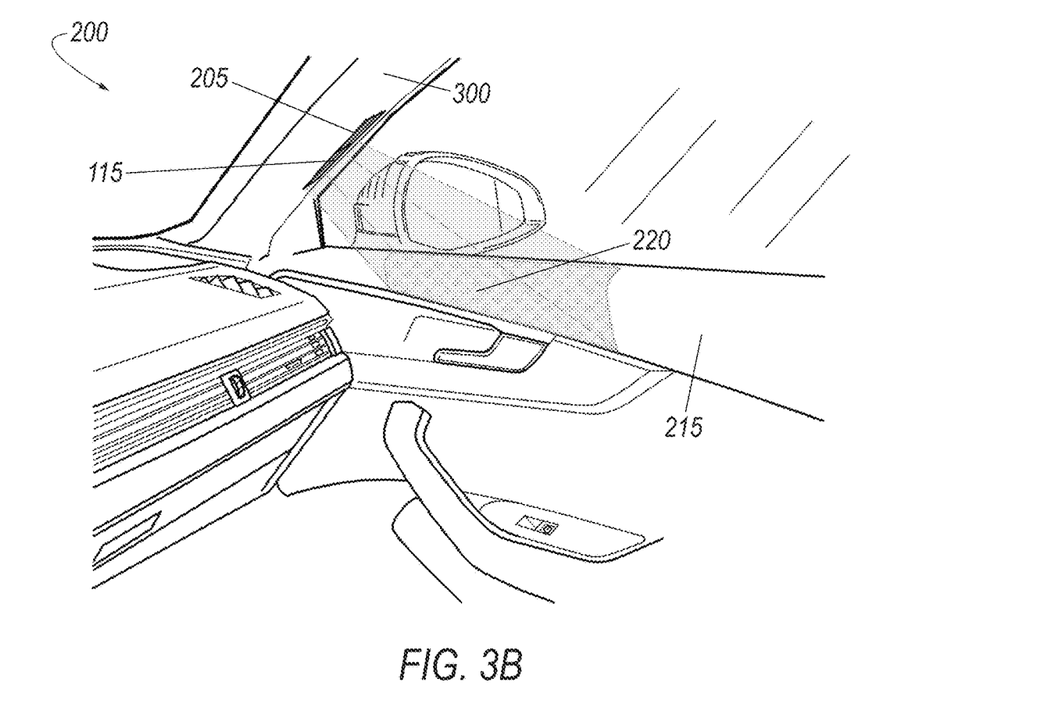

FIG. 3B illustrates the projector 205 projecting a detectable pattern 220 onto the surface 215. The surface 215 can include a detectable pattern 220 that can be projected onto the surface 215 by the projector 205 and/or embedded within the surface 215. That is, the detectable pattern 220 can be projected using near-IR or UV light and/or the detectable pattern 220 can be drawn in an invisible ink, such as near-IR or UV ink described above. For example, if the pattern 220 is drawn in fluorescent ink, the projectors 205 can project UV light onto the pattern 220 to fluoresce, causing the pattern 220 to become visible to the user.

Figure 3C:
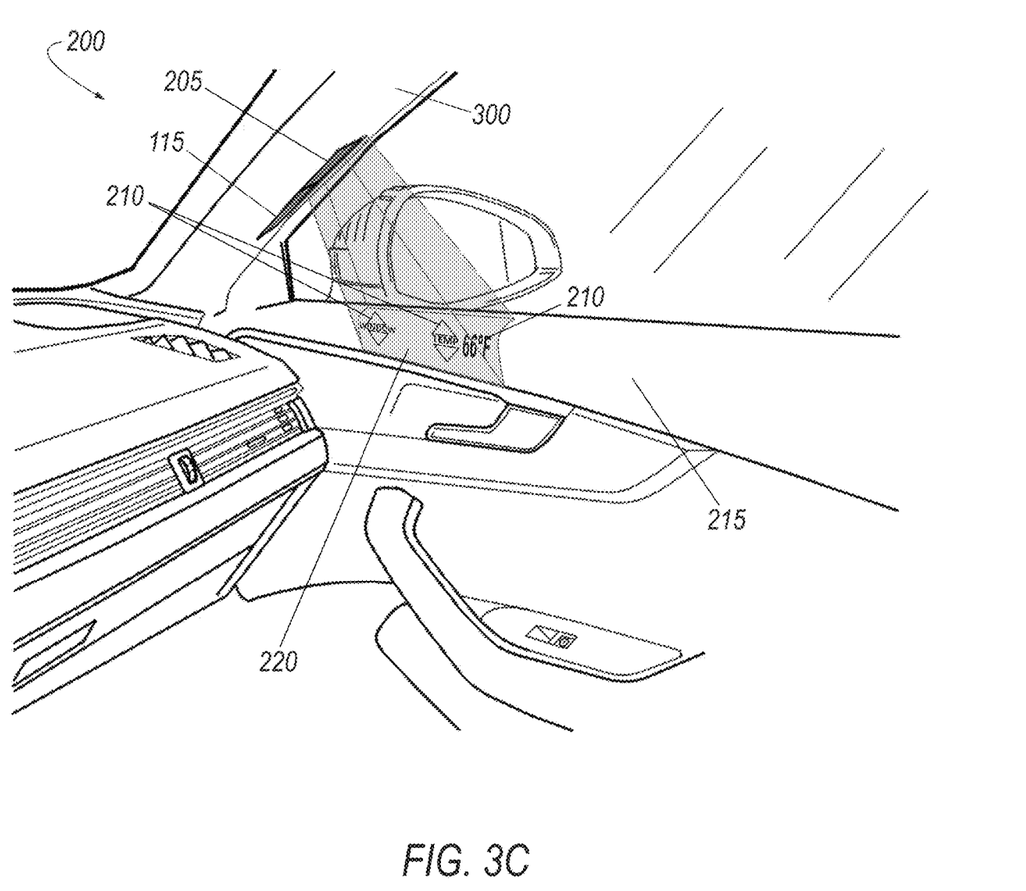

FIG. 3C illustrates the projector 205 projecting icons 210 on the surface 215. The icons 210 include polygons that control a position of a window, polygons that adjust a temperature for a climate controller, and text indicating the specified temperature for the vehicle 105. FIG. 3C shows the projector 205 projecting visible light for the icon 210 on the pattern 220 and the surface 215. The computer 110 instructs the projector 205 to provide data to the user on the surface 215. For example, in addition to the icons 210 that can receive input from the user to actuate one or more components 120, the computer 110 can instruct the projector 205 to project data relevant to the icons, e.g., a current cabin temperature, a desired cabin temperature, etc.

Figure 3D:
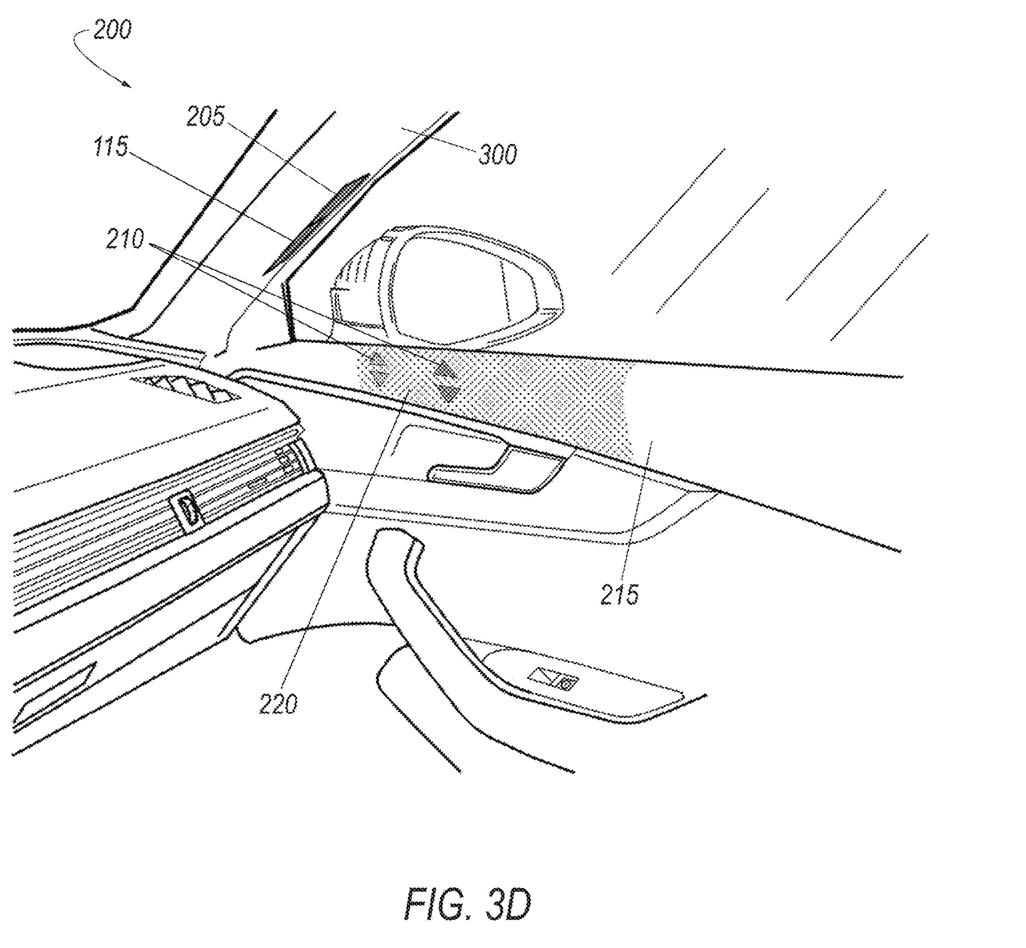

FIG. 3D illustrates the projector 205 projecting icons 210 onto the surface 215 with an embedded pattern 220. As described above, the pattern 220 can be a dot lattice drawn in invisible ink. Thus, when the user provides input to the icons 210, the camera 115 can detect changes in the pattern 220 caused by the input to the icons 210, and the user would not see the changes to the pattern 220. Based on the changes to the pattern, the computer 110 can determine the user input. For example, if the pattern 220 is drafted in a luminescent mechanochromism ink and a portion of the pattern 220 within one of the icons 210 fluoresces, the computer 110 can determine that the user has provided input to the icon 210 with the fluorescent change in the pattern 220.

Figure 3E:
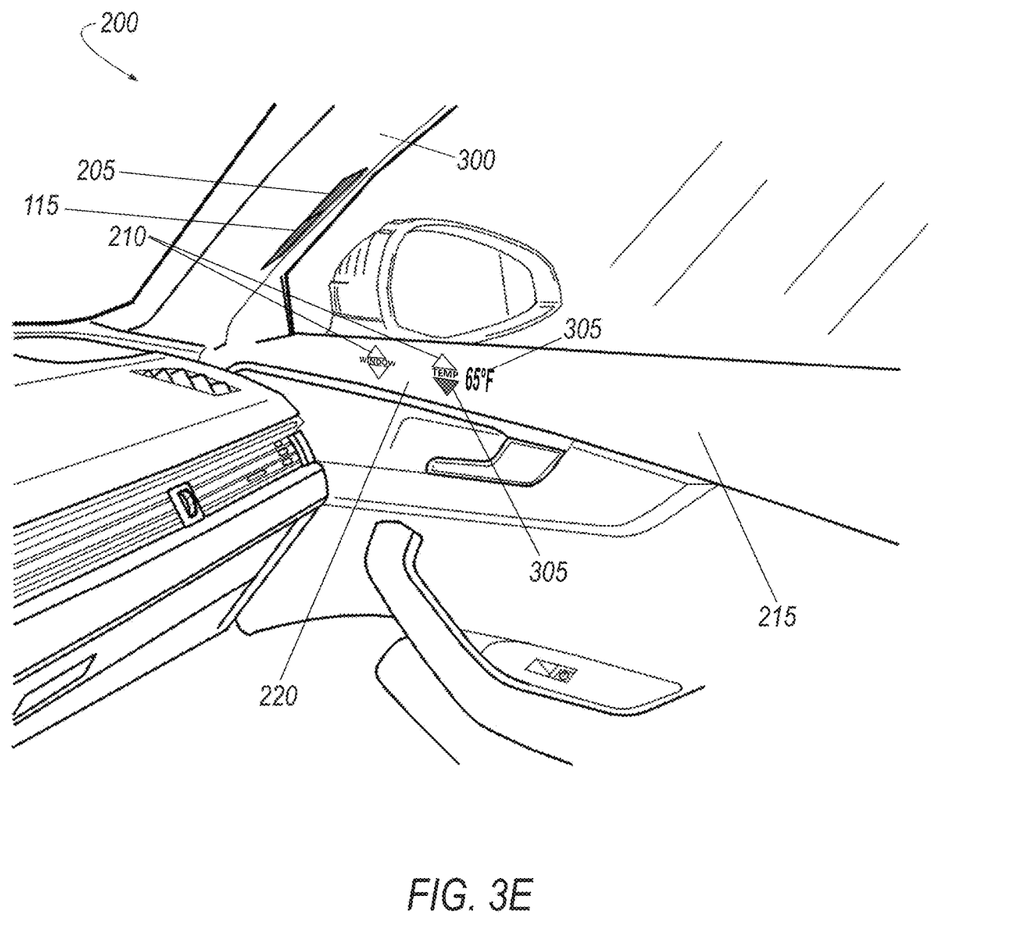

FIG. 3E illustrates the projector 205 providing output 305 to the user based on user input. When a user provides input to the icon 210, the computer 110 can detect a change of the detectable pattern 220 and the computer 110 can provides output 305 to the user. For example, the output 305 can be, e.g., an icon, a haptic output, a sound, etc. In the example of FIG. 3E, the output 305 can be a change in color in one of the icons 210 indicating that the user has provided input to the icon 210 and a change in text representing the change to one of the components 120 corresponding to the input to the icon 210.

Figure 4:
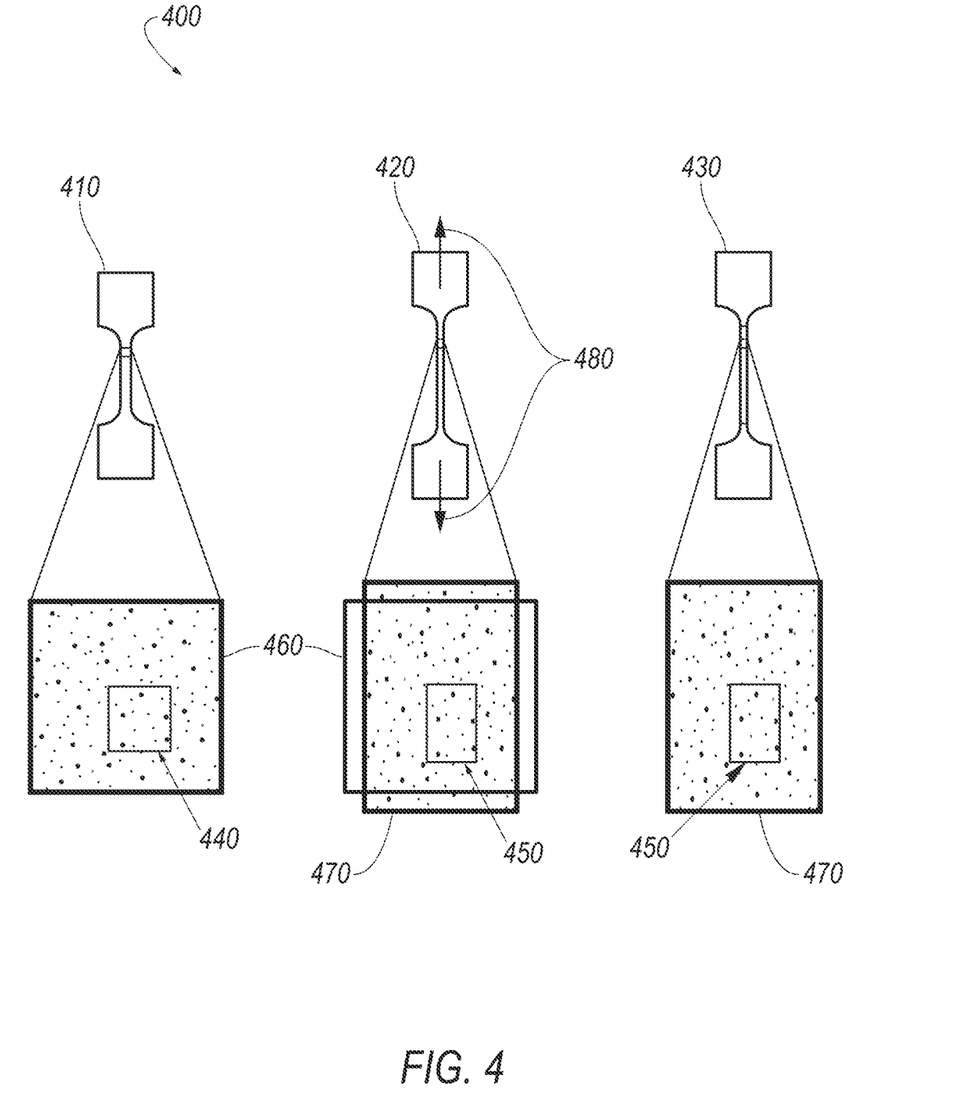
FIG. 4 is a diagram of example strain gauges indicating changes to a pattern caused by forces applied to the strain gauges.

FIG. 4 illustrates how the pattern 220 deforms as the surface 215 is strained. A system 400 for measuring elastic deformation on a specimen 410, 420, 430 can indicate deformations of the surface 215 caused by specific forces applied to the surface 215. The system 400 can provide a specified axial force to the specimen 410, 420, 430, inducing strains in the specimen 410, 420 430 and deforming a pattern 440 on the specimen 410, 420, 430. For example, the specimen 410 illustrates the state of the surface 215 before any force is applied, i.e., a "reference state." An associated detection pattern 440 can be embedded within or projected on to the surface 215. In the reference state, the detection pattern 440 can be analyzed for calibration and measurements.

A specimen 420 illustrates a force 480 applied to the surface 215 that deforms the detection pattern 440. When the user applies a force or otherwise interacts with the surface 215, the user disturbs the detection pattern 440, generating an overall deformation 460 of the detection pattern 440. During the deformation 460, the camera 115 can detect a deformed subset 450 of the detection pattern 440. A deformed area 470 can surround the deformed subset 450 of the detection pattern 440. The cameras 115 can track and measure the changes to the detection pattern 440 caused by the force 480. The deformed area 470 of the surface 215 changes the detection pattern 440 into the deformed subset 450.

A specimen 430 illustrates how the computer 110 uses the deformed subset 450 to correlate disturbances in the surface 215 to measure force and/or strain when an icon 210 is selected by the user. That is, because the system 400 applied a specified axial force 480 to generate the deformed subset 450, the computer 110 can identify the displacements of the deformed subset 450 from the detection pattern 440 and correlate the displacements to the specified axial force 480. The computer 110 can correlate specific deformed subsets 450 to specified forces 480, and upon collecting image data from a camera 115, the computer 110 can compare the deformed pattern 220 in the image to the deformed subsets 450 using a conventional image processing technique (e.g., deep learning, digital image correlation, etc.) to determine the force applied by the user. That is, upon determining correlations between a plurality of specific deformed subsets 450 to specified forces 480, the computer 110 can, upon receiving an image with a deformed pattern 220, output a force that generated the deformed pattern 220.

Figure 5:
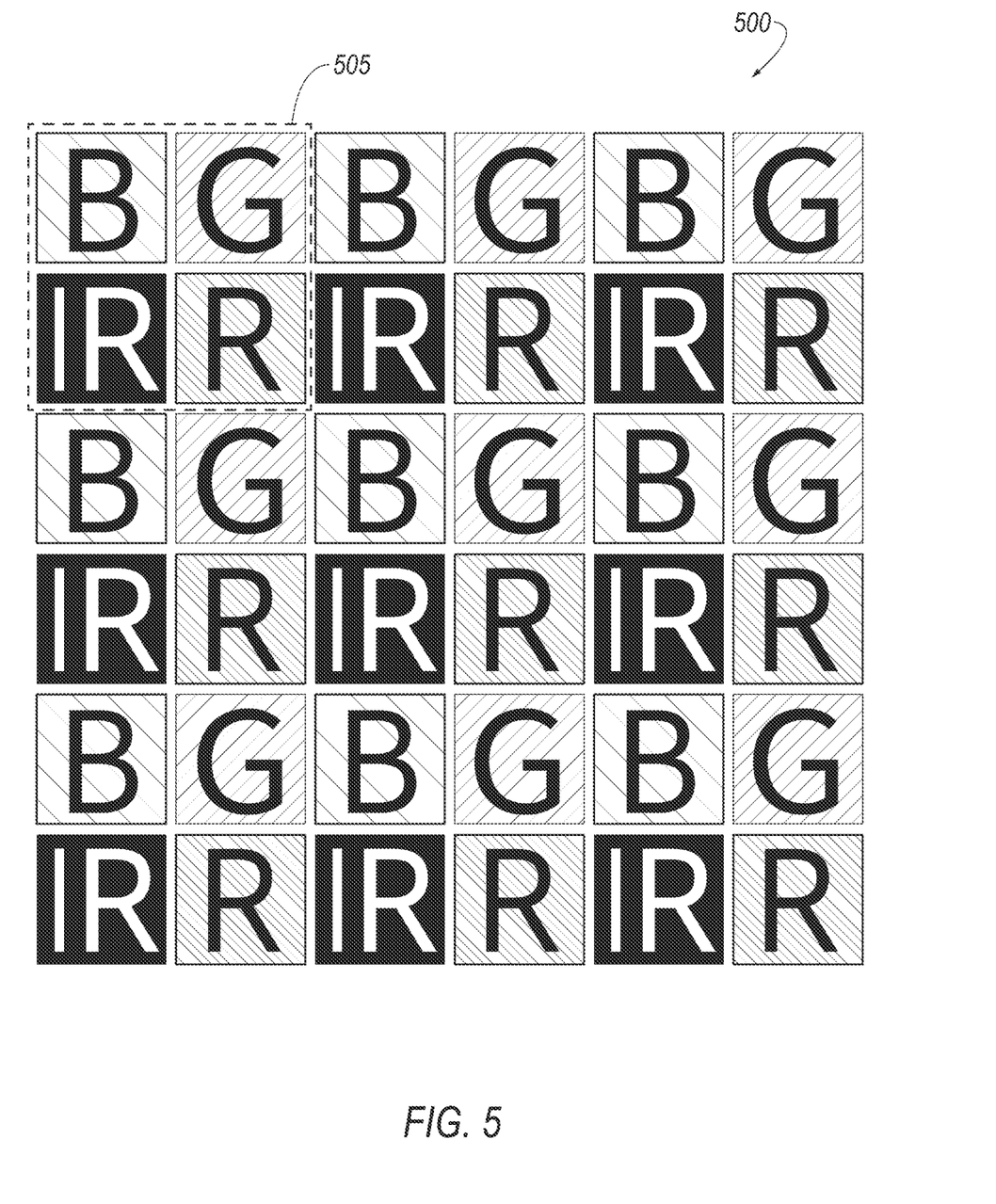
FIG. 5 is a diagram of an example color filter array for a camera collecting images of the surface.

FIG. 5 is a diagram of an example dynamic color filter array 500 that may be equipped in a single camera 115. By employing a color filter array 500, a single camera can detect changes in the detection pattern. Such filter arrays allow a single camera 115 to detect both spatial and color differences in an image. Typically, each "color" in the filter array 500 is a set of filters 505 placed above one or more pixels of the camera sensor, e.g., 2×2 arrays of pixels. The filter array 500 may have one or more "color" filters regularly spaced across the array 500. In FIG. 5, the color filters include a blue color filter (labeled as "B" in FIG. 5), a green color filter (labeled "G" in FIG. 5), a red color filter (labeled "R" in FIG. 5), and an infrared color filter (labeled "IR" in FIG. 5). The color filter array 500 may feature open pixels (i.e., pixels without a color filter to increase sensitivity of those pixels or other arrangements that balance tradeoffs in the detection and sensitivity of the camera 115. Upon collecting an image, the computer 110 can "de-mosaic" the image, e.g., according to conventional de-mosaicking techniques, to reconstruct a full color image through interpolation or another algorithm (e.g. machine learning). Additionally or alternatively, the computer 110 can perform a conventional image signal processing technique such as color balancing, white balancing, exposure control, etc.

Figure 6:
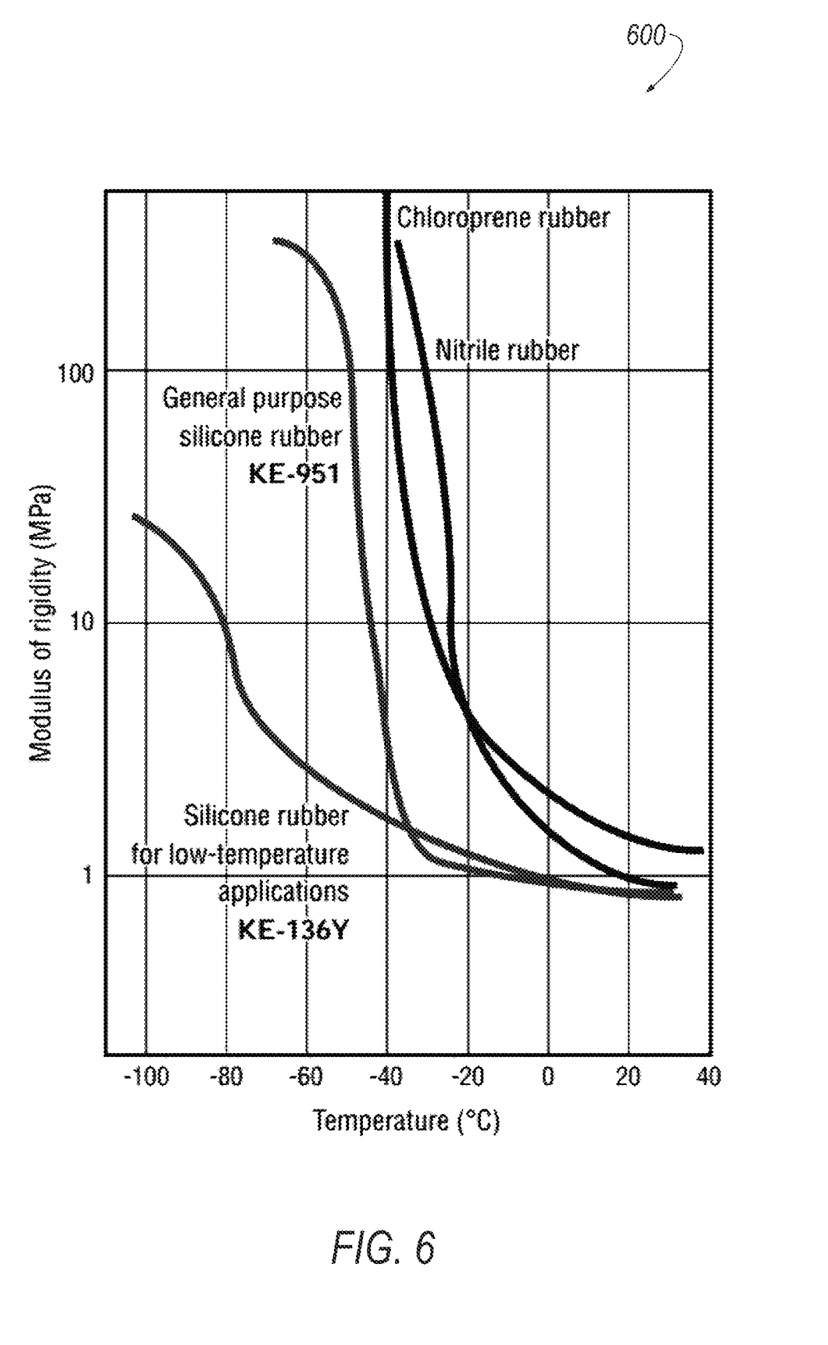
FIG. 6 is a chart of material properties of the surface at specific temperatures.

FIG. 6 is a diagram of material properties of a plurality of materials. Material properties of materials used for the surface may exhibit varying elastic stiffness with temperature and loading rates. Some materials may exhibit viscoelastic mechanical properties where the solid behaves as both a viscous and elastic material. That is, the material can show time dependent strain behavior, e.g. slow relaxation of strain after force input. A chart 600 illustrates the changes in deformation strength on different interior surface materials at different temperatures. The computer 110 can compensate for the differences in elastic stiffness of the material of different materials by calibrating values of deformation strength of the surface material based on a current temperature and age of the surface 215. For example, the computer 110 can compensate for aging of materials of the surface 215 using time-based correction for the viscoelastic surface materials to correct for calculations associated with the strain gauge measurement shown in FIG. 4. The surface 215 can be an elastomeric material, e.g. silicone. The surface 215 can be pliable, i.e., elastically deformable by typical forces applied by fingers of users. A pliable surface allows the detection pattern to deform responsive to pressure similar to a finger press. The cameras 115 can track and measure user inputs over a period of time based on the deformation of the surface 215 and the detection pattern 220.

Figure 7:
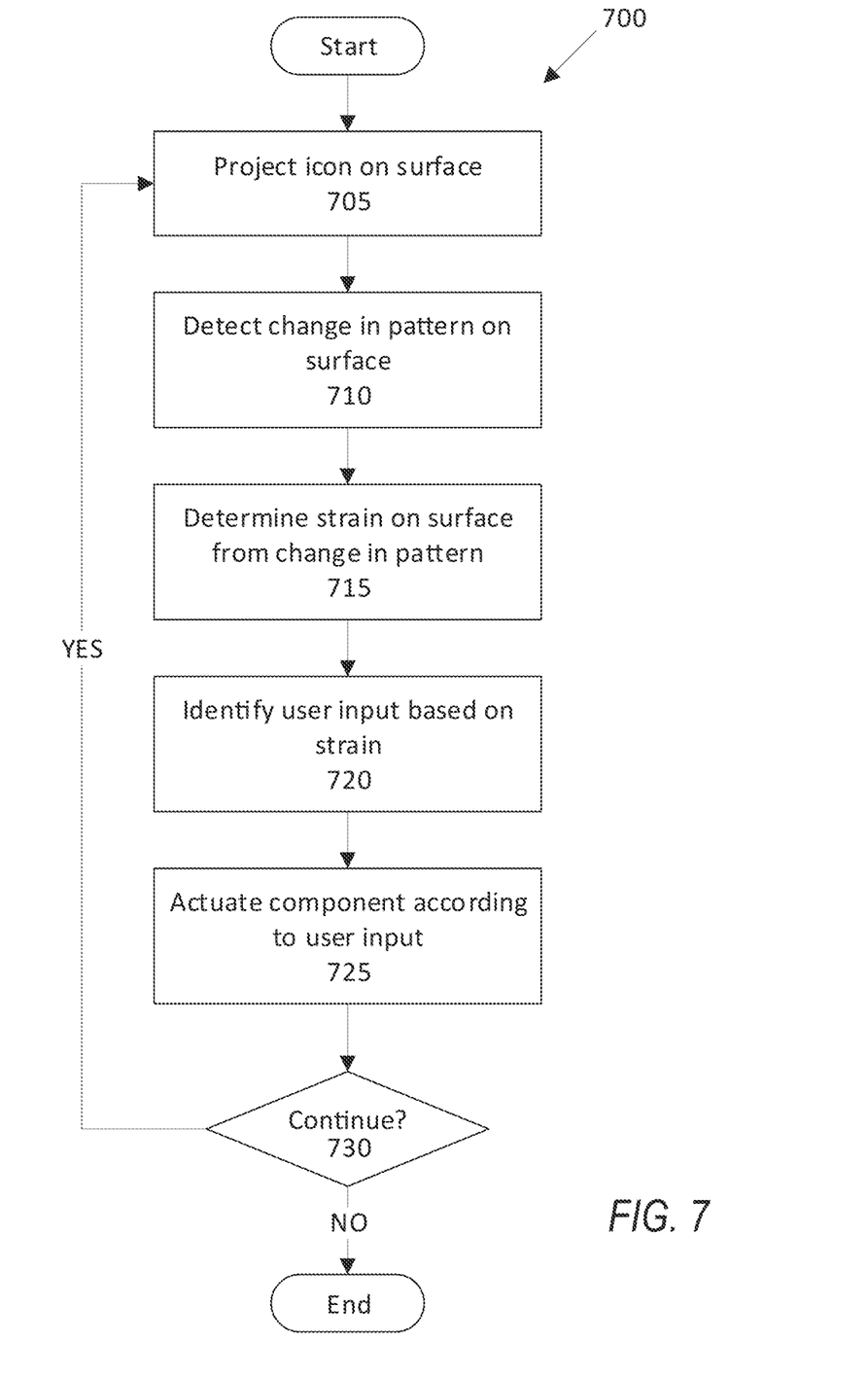
FIG. 7 is a diagram of an example process for operating components of the vehicle.

FIG. 7 is a diagram of an example process 700 for operating components of a vehicle 105. The process 700 begins in a block 705, in which a computer 110 of the vehicle 105 instructs a projector assembly 200 to project an icon 210 on a surface 215. The projector assembly 200 includes a projector 205 that projects the icon 210. That is, the projector 205 can emit visible light onto the surface 215, and the icon 210 is the image that appears on the surface 215 from the light emitted by the projector 205.

Next, in a block 710, the computer 110 detects a change in a specified pattern 220 on the surface 215. As described above, the surface 215 can include a pattern 220 in, e.g., invisible ink. The computer 110 can actuate a camera 115 to collect an image of the surface 215 including the pattern 220. The computer 110 can use a conventional image processing technique, e.g., a deep learning algorithm, digital image correlation, etc., to detect a change in the pattern 220 from a default pattern 220 stored in the computer 110. That is, when a user provides input to the icon 210, a finger of the user can disturb the surface 215, causing the pattern 220 to deform. The computer 110 can determine the change of the pattern 220 caused by the finger.

Next, in a block 715, the computer 110 can determine a strain on the surface 215 based on the change in the specified pattern 220. As described above, the computer 110 can use an image processing technique such as a deep learning algorithm or a digital image correlation algorithm to determine the strain on the surface 215 caused by the finger of the user. The computer 110 can classify the strain as one of a shear strain, a compressive strain, or a circular strain. For example, if the change in the specified pattern 220 results in a strain field along a line, the computer 110 can determine that the strain is a shear strain. In another example, if the change in the pattern 220 results in a strain field toward a point, the computer 110 can determine that the strain is a compressive strain. In another example, if the change in the pattern 220 results in a strain field along a circle, the computer 110 can determine that the strain is a circular strain.

Next, in a block 720, the computer 110 identifies a user input based on the identified strain field. As described above, the user can provide input to the icon 210 for specific actuation of one or more components 120. For example, if the icon 210 is a triangular shape for a climate controller, compressive input to the icon 210 can indicate a pressing motion to actuate the climate controller according to the icon 210. The computer 110 can identify the user input using, e.g., a deep learning program, a finite element analysis model, etc., to determine the force applied to the icon 210 from the user input. The computer 110 can identify the user input as a compressive input to the icon 210 upon identifying the strain as a compressive strain. The computer 110 can identify the user input as a shear input upon identifying the strain as a shear strain. The computer 110 can identify the user input as a rotational input upon identifying the strain as a circular strain. When the computer 110 identifies the rotational input, the computer 110 can determine the direction (e.g., clockwise or counter-clockwise) of the input. The computer 110 can identify a magnitude of the user input, i.e., force applied by the user to provide the input.

Next, in a block 725, the computer 110 actuates one or more components 120 according to the identified user input. For example, the computer 110 can adjust a climate controller to adjust a cabin air temperature based on the identified compressive input provided by the user to the icon 210. In another example, the computer 110 can adjust a volume of an entertainment controller based on the identified rotational input provided by the user to the icon 210. In another example, the computer 110 can adjust a rate at which the volume changes based on the magnitude of the input. For example, the computer 110 can include a look-up table or the like that correlates the magnitude of the input with rates of volume adjustment determined by empirical testing users providing specified forces to test surfaces and determining a linear regression between the specified forces and volume adjustment.

Next, in a block 730, the computer 110 determines whether to continue the process 700. For example, the computer 110 can determine to continue the process 700 upon actuating the components 120 and determining to provide an icon 210 to the user to actuate another component 120. If the computer 110 determines to continue, the process 700 returns to the block 705. Otherwise, the process 700 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 700, one or more of the steps could be omitted, or the steps could be executed in a different order than shown in FIG. 7. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising a computer including a processor and a memory, the memory storing instructions executable by the processor to:
    project an icon onto a surface having a pattern;
    capture an image of the icon and the pattern;
    identify a deformation of the surface;
    identify a change between the pattern in the image and a default pattern deformed by the identified deformation of the surface;
    identify a user input based on the change from the default pattern; and
    actuate a component based on the user input.

2. The system of claim 1, wherein the instructions further include instructions to classify the user input to a classification based on the deformation of the surface, the classification being one of a compressive input, a shear input, or a rotation input.

3. The system of claim 2, wherein the instructions further include instructions to actuate the component based on the classification.

4. The system of claim 1, wherein the instructions further include instructions to identify the deformation of the surface based on at least one of an elastic stiffness of the surface or a temperature of the surface.

5. The system of claim 1, wherein the pattern is invisible in a visible light range.

6. The system of claim 5, wherein the pattern includes at least one of a piezochromic ink, a luminescent mechanochromism ink, a color alteration mechanochromism ink, or an encryption mechanochromism ink.

7. The system of claim 1, wherein the change from the default pattern is at least one of a change in color, a change in shape, a change in luminance, or a revealing of a second pattern.

8. The system of claim 1, wherein the instructions further include instructions to identify a finger providing the user input.

9. The system of claim 8, wherein the instructions further include instructions to collect near-infrared electromagnetic wave data and to identify the finger providing the user input based on the near-infrared electromagnetic wave data.

10. The system of claim 1, wherein the instructions further include instructions to adjust the icon based on the change in the pattern.

11. The system of claim 1, wherein the instructions further include instructions to provide a haptic output based on the change in the pattern.

12. A method, comprising:
    projecting an icon onto a surface having a pattern;
    capturing an image of the icon and the pattern;
    identifying a deformation of the surface;
    identifying a change between the pattern in the image and a default pattern deformed by the identified deformation of the surface;
    identifying a user input based on the change from the default pattern; and
    actuating a component based on the user input.

13. The method of claim 12, further comprising classifying the user input to a classification based on the deformation of the surface, the classification being one of a compressive input, a shear input, or a rotation input.

14. The method of claim 13, further comprising actuating the component based on the classification.

15. The method of claim 12, further comprising identifying the deformation of the surface based on at least one of an elastic stiffness of the surface or a temperature of the surface.

16. The method of claim 12, wherein the pattern is invisible in a visible light range.

17. The method of claim 12, wherein the change from the default pattern is at least one of a change in color, a change in shape, a change in luminance, or a revealing of a second pattern.

18. The method of claim 12, further comprising adjusting the icon based on the change in the pattern.

* * * * *